(12) United States Patent
Black

(10) Patent No.: US 9,589,295 B2
(45) Date of Patent: Mar. 7, 2017

(54) PURCHASING SYSTEMS AND METHODS

(71) Applicant: Black Rose Network, Inc., Beverly Hills, CA (US)

(72) Inventor: Alistair Black, Los Gatos, CA (US)

(73) Assignee: VM-Robot, Inc., Los Gatos, CA (US)

(*) Notice: Subject to any disclaimer, the term of this patent is extended or adjusted under 35 U.S.C. 154(b) by 220 days.

(21) Appl. No.: 14/067,757

(22) Filed: Oct. 30, 2013

(65) Prior Publication Data
US 2015/0120508 A1  Apr. 30, 2015

(51) Int. Cl.
*G06Q 30/06* (2012.01)

(52) U.S. Cl.
CPC ..... *G06Q 30/0635* (2013.01); *G06Q 30/0601* (2013.01)

(58) Field of Classification Search
CPC .............................. G06G 30/06; G06G 30/08
USPC ................................................ 705/26.1–27.2
See application file for complete search history.

(56) References Cited

U.S. PATENT DOCUMENTS

| | | | | |
|---|---|---|---|---|
| 6,199,079 B1 * | 3/2001 | Gupta | ................. | G06F 17/2247 707/999.006 |
| 7,637,426 B1 | 12/2009 | Green | | |
| 7,827,103 B1 | 11/2010 | Fu | | |
| 2005/0049928 A1 | 3/2005 | Naick | | |
| 2007/0079308 A1 | 4/2007 | Chiaramonte | | |
| 2010/0235825 A1 * | 9/2010 | Azulay et al. | ................. | 717/172 |
| 2011/0145091 A1 * | 6/2011 | Tarvydas et al. | ............ | 705/26.8 |
| 2013/0024472 A1 | 1/2013 | Stein | | |
| 2014/0304738 A1 * | 10/2014 | Nakaoka | ................. | G06F 13/00 725/37 |

OTHER PUBLICATIONS https://answers.yahoo.com/question/index?qid=20100108160819AAONyK5, What's the difference between sequential programming and parallel programming. 2010.*

* cited by examiner

*Primary Examiner* — Ethan D Civan
*Assistant Examiner* — Ming Shui
(74) *Attorney, Agent, or Firm* — David R. Stevens; Stevens Law Group

(57) ABSTRACT

Example purchasing systems and methods are described. In one implementation, a method identifies a purchase request that includes a first item to purchase from a first merchant and a second item to purchase from a second merchant. A first virtual machine is invoked and executes an instance of a browser application to purchase the first item from the first merchant. A second virtual machine is invoked and executes another instance of the browser application to purchase the second item from the second merchant. The method receives a first purchase confirmation from the first merchant and receives a second purchase confirmation from the second merchant.

17 Claims, 9 Drawing Sheets

PURCHASING SYSTEMS AND METHODS

TECHNICAL FIELD

The present disclosure relates to online purchasing systems and methods that support purchasing of items from multiple merchants.

BACKGROUND

The popularity of online purchasing continues to grow. A variety of products and services are purchased every day from a significant number of online merchants. Many users purchase multiple products from multiple different online merchants, which can be tedious to the user. Visiting multiple merchants, filling multiple shopping carts, and initiating multiple checkout processes are time-consuming and include many repetitive operations. The systems and methods described herein provide an improved approach for users desiring to purchase multiple items from multiple different merchants.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
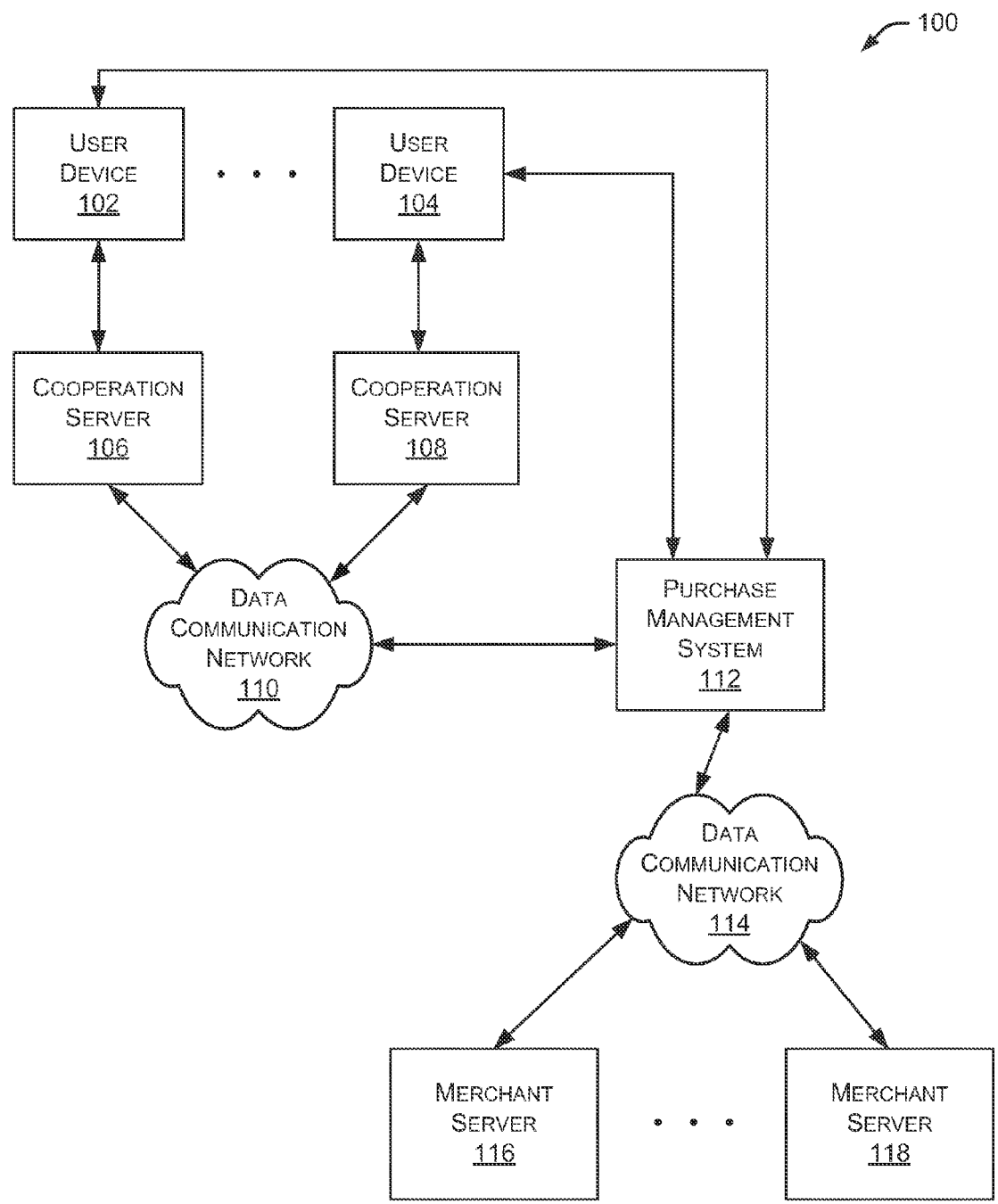
FIG. 1 is a block diagram depicting an environment within which an example embodiment may be implemented.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein allow a user to select and purchase multiple items from multiple merchants in a single transaction. As used herein, an "item" may refer to a product, a group of products, a service, a group of services, a combination of a product and a service, and anything else that can be purchased by a user. The described systems and methods invoke a virtual machine for each merchant associated with a particular user's order. Each virtual machine purchases items from the associated merchant on behalf of the user. Purchase confirmations are received from the multiple merchants and communicated to the user. In other embodiments, the purchase confirmations are captured by the purchase management system, which then creates and sends a separate notification message to the user. In these embodiments, the user receives fewer messages since all purchases in a particular purchase transaction are grouped together in a single notification message.

The systems and methods described herein simplify the purchase process for the user by automatically purchasing the multiple items from multiple different merchants. The described systems and methods aggregate multiple purchase transactions with multiple merchants. Thus, a user can select multiple items to purchase and perform a single check-out process. The systems and methods described herein automatically purchase the multiple items from the appropriate merchants without requiring any further input from the user. These systems and methods can purchase items from any merchant without requiring any cooperation or integration on the part of the merchant. For example, the systems and methods described herein do not require any software integration or process integration with any of the merchants. Additionally, the speed of the purchasing process is increased by purchasing the multiple items at substantially the same time (i.e., purchasing items from two different merchants simultaneously). In some embodiments, the described systems and methods purchase items in a serial manner, while still improving the purchase transaction as compared to a manual approach. This automated approach to the purchase process allows users to more quickly complete the purchase and checkout transactions by automatically placing the order for the user based on known user information (e.g., name, shipping address, credit card information, and the like).

FIG. 1 is a block diagram depicting an environment 100 within which an example embodiment may be implemented. Environment 100 includes user devices 102 and 104 coupled to cooperation servers 106 and 108 respectively. Although two user devices 102, 104 and two cooperation servers 106, 108 are shown in FIG. 1, alternate embodiments may include any number of user devices and cooperation servers. Additionally, multiple user devices may access a common cooperation server, and a particular user device may access any number of different cooperation servers. User devices 102, 104 include any type of device capable of communicating with cooperation servers 106, 108. Example user devices 102, 104 include a cellular phone, a smart phone, a tablet computer, a laptop computer, a desktop computer, a portable entertainment device, a portable gaming device, a set top box, and the like. Cooperation servers 106, 108 support the web sites that show multiple items available for purchase and coordinate with a purchase management system 112 (discussed below) to purchase one or more items selected by a user. Examples of cooperation servers 106, 108 include merchant web sites, product review sites, blogs, and other web sites that present items available for users to purchase. The cooperation servers 106, 108 display multiple items that can be added to a "universal shopping cart" that is capable of containing items from multiple different merchants or retailers. Cooperation servers 106, 108 maintain one or more pages that contain items from any number of retailers or merchants. These items are assembled on cooperation servers 106, 108 in a variety of arrangements. On method uses a software application that allows a user to assemble items from multiple merchants onto one or more web pages supported by cooperation servers 106, 108. In another embodiment, a blogger (or other user) assembles items on a blog (or other web site) for sale and uses the purchase management system discussed herein to execute the purchase of items. The universal shopping cart then uses the systems and methods described herein to automatically purchase the selected items from the multiple merchants. Thus, the purchasing process is simplified for the user by presenting all of the items in a single universal shopping cart, and automating the purchase of those items.

Example cooperation servers 106, 108 include any computing device capable of communicating with multiple user devices and communicating with other devices and systems through a data communication network 110, such as the Internet. Data communication network 110 may utilize any communication protocol and any type of communication medium. In some embodiments, data communication network 110 is a combination of two or more networks coupled to one another.

The purchase management system 112 is also coupled to data communication network 110 as well as a second data communication network 114. Data communication network 114 may utilize any communication protocol and any type of communication medium. In some embodiments, data communication network 114 is a combination of two or more networks coupled to one another. In particular implementations, data communication networks 110 and 114 are the same network, such as the Internet. Additionally, purchase management system 112 is coupled to user devices 102, 104. Although user devices 102, 104 are shown in FIG. 1 as being directly coupled to purchase management system 112, in particular implementations user devices 102, 104 are coupled to purchase management system 112 through one or more data communication networks (e.g., data communication network 110 or 114) or other systems. For example, user devices 102, 104 may interact with cooperation servers 106, 108 to allow users to identify items for purchase. After selecting the items, user devices 102, 104 are redirected to purchase management system 112 to manage the checkout process, discussed herein.

Purchase management system 112 is capable of coordinating the purchase of multiple items from multiple merchants, as discussed in greater detail herein. For example, purchase management system 112 may facilitate the purchase of multiple items selected by a user of user device 102 or 104. Purchase management system 112 communicates with any number of merchant servers (e.g., 116 and 118) to purchase the multiple items selected by the user. Merchant servers 116, 118 include any computing device capable of communicating with purchase management system 112 as well as other devices and systems through data communication network 114.

Figure 2:
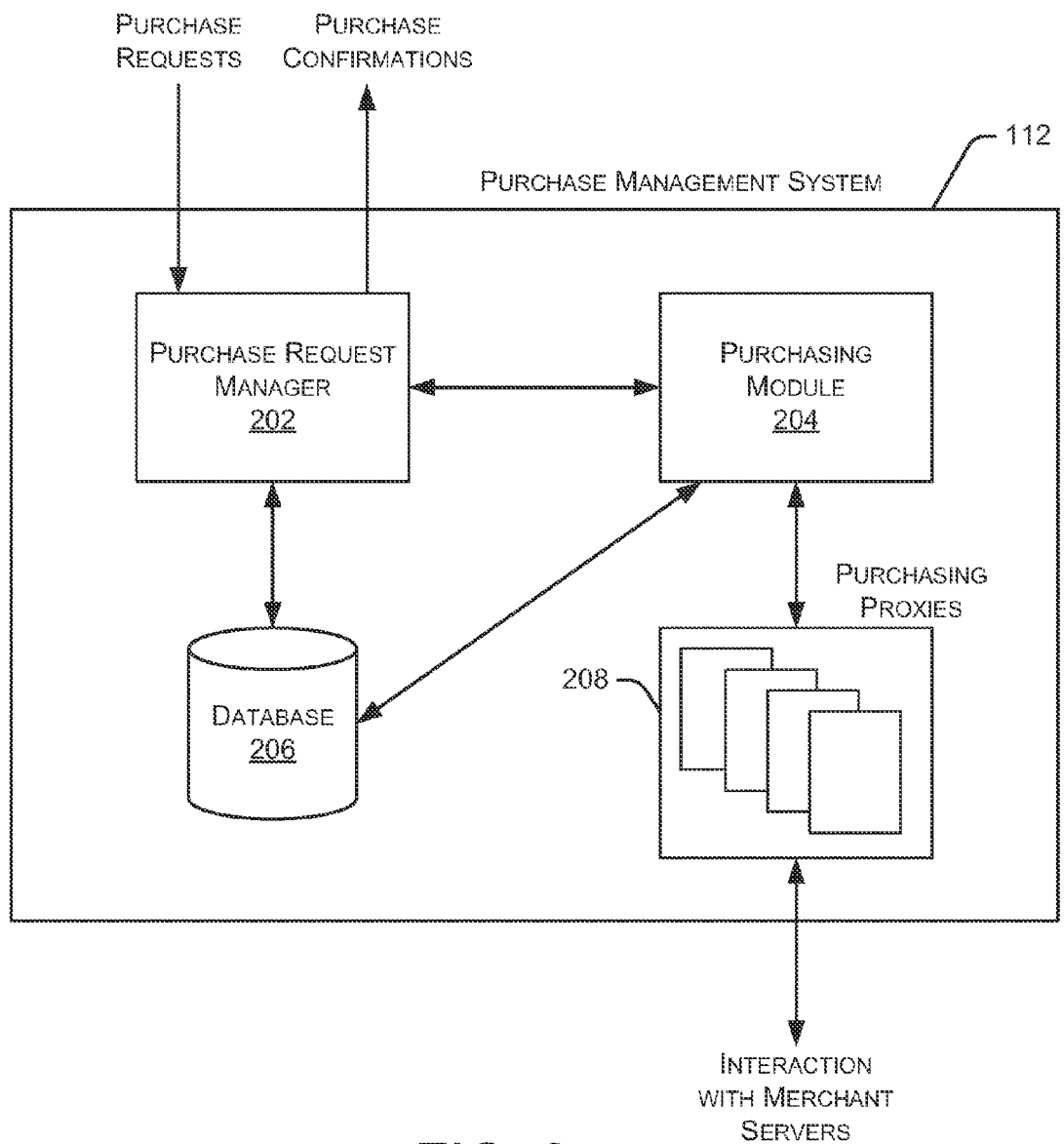
FIG. 2 is a block diagram depicting an embodiment of a purchase management system.

FIG. 2 is a block diagram depicting an embodiment of purchase management system 112. As shown in FIG. 2, a purchase request manager 202 receives purchase requests from one or more users who indicate items they want to purchase through, for example, cooperation servers 106, 108. Alternatively, the purchase requests may be received directly from one or more users, or received from another system. The purchase request manager 202 also communicates purchase confirmations to users, such as through cooperation servers 106, 108, purchase management system 112, or another system. In particular embodiments, purchase confirmations are communicated from purchase request manager 202 directly to users. A purchase request includes, for example, data describing items in the purchase request, such as item name, item identification number (e.g., an item URL (Uniform Resource Locator) that identifies both a merchant and a particular item), item color, item size, item price, and the like. A purchase request may also include information about a user, such as user name, shipping address, telephone number, email address, encrypted credit card information, and the like. Purchase request manager 202 may also obtain information about an item, a merchant or a user from a database 206. Database 206 may store, for example, a user's encrypted credit card information, user login data for various merchant sites, and the like. Additionally, purchase request manager 202 is capable of validating a user's identity, determining whether particular items in a purchase request are currently available from the merchant in the desired size/color, and communicating with a purchasing module 204 coupled to purchase request manager 202. If a user is identified as an existing user of purchase management system 112, the user's previously stored data is retrieved from database 206 and used for the current purchase transaction, thereby providing a simplified purchase experience for the user.

Purchasing module 204 manages the purchasing of multiple items from multiple merchants as identified in a particular purchase request. Additionally, purchasing module 204 is coupled to database 206 to access merchant data, merchant templates (discussed herein), user data, purchase request data, and the like. Purchasing module 204 is also coupled to multiple purchasing proxies 208, which are virtual machines invoked to purchase the various items contained in the purchase request. As discussed herein, a separate purchasing proxy 208 is invoked for each merchant identified in a particular purchase request. Each purchasing proxy 208 interacts with one of the merchants to purchase one or more items from that merchant. Upon successful completion of the purchase from the merchant, purchasing proxy 208 communicates a purchase confirmation to purchasing module 204, which forwards the purchase confirmation to purchase request manager 202. Upon receiving one or more purchase confirmations, purchase request manager 202 communicates the purchase confirmation(s) to the user associated with the purchase request.

Figure 3:
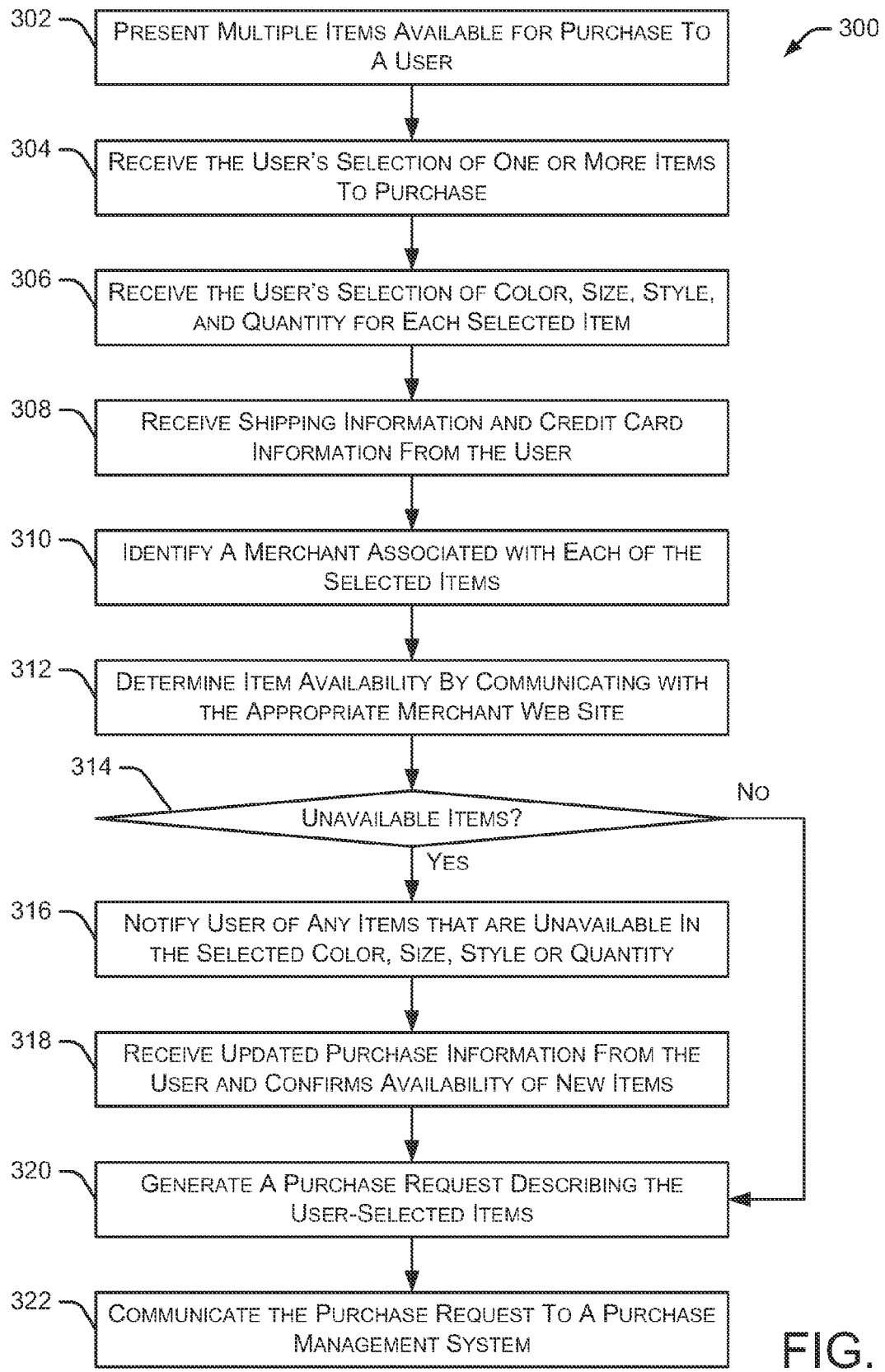
FIG. 3 is a flow diagram depicting an embodiment of a method for generating a purchase request including multiple items.

FIG. 3 is a flow diagram depicting an embodiment of a method 300 for generating a purchase request including multiple items. Method 300 is implemented, for example, within environment 100 shown in FIG. 1. Initially, a system (e.g., a cooperation server 106, 108) presents multiple items available for purchase to a user at 302. For example, the multiple items may include related items that a user would purchase together, such as a dress, shoes, handbag, and jewelry. The user selects items to purchase from the listing of multiple items. Method 300 receives the user's selection of one or more items to purchase at 304 and receives the user's selection of color, size, style, and quantity for each selected item at 306. Although 304 and 306 are shown as separate steps, these activities may be performed in a single step. Additionally, method 300 receives shipping information and credit card information from the user at 308. For security purposes, the user's credit card information is communicated between user device 102, 104 and purchase management system 112 using a secure connection. Once the credit card information is received by purchase management system 112, the information is encrypted and stored, at least temporarily, within purchase management system 112.

Method 300 continues by identifying a merchant associated with each of the items at 310. The availability of each item selected by the user is confirmed by communicating with the appropriate merchant web site at 312 (i.e., the merchant associated with the particular item being confirmed). If any of the items selected by the user are determined to be unavailable at 314, the user is notified of the unavailable items at 316. The user is then given an option to select a different item or select the same item in a different color, size or style. In alternate embodiments, item availability is not determined until the shopping cart checkout process is initiated. Method 300 receives updated purchase information from the user at 318 and confirms availability of the newly selected items. In alternate embodiments, the item availability steps (e.g., steps 312-318 in FIG. 3) are not performed. In these alternate embodiments, the item availability is determined at a later time, such as during the purchasing process discussed below. Additionally, the availability for all items may be checked before communicating with the user, thereby minimizing the interaction with the user until the availability of all items has been determined. Finally, method 300 generates a purchase request describing the user-selected items at 320 and communicates the purchase request to a purchase management system at 322.

Figure 4:
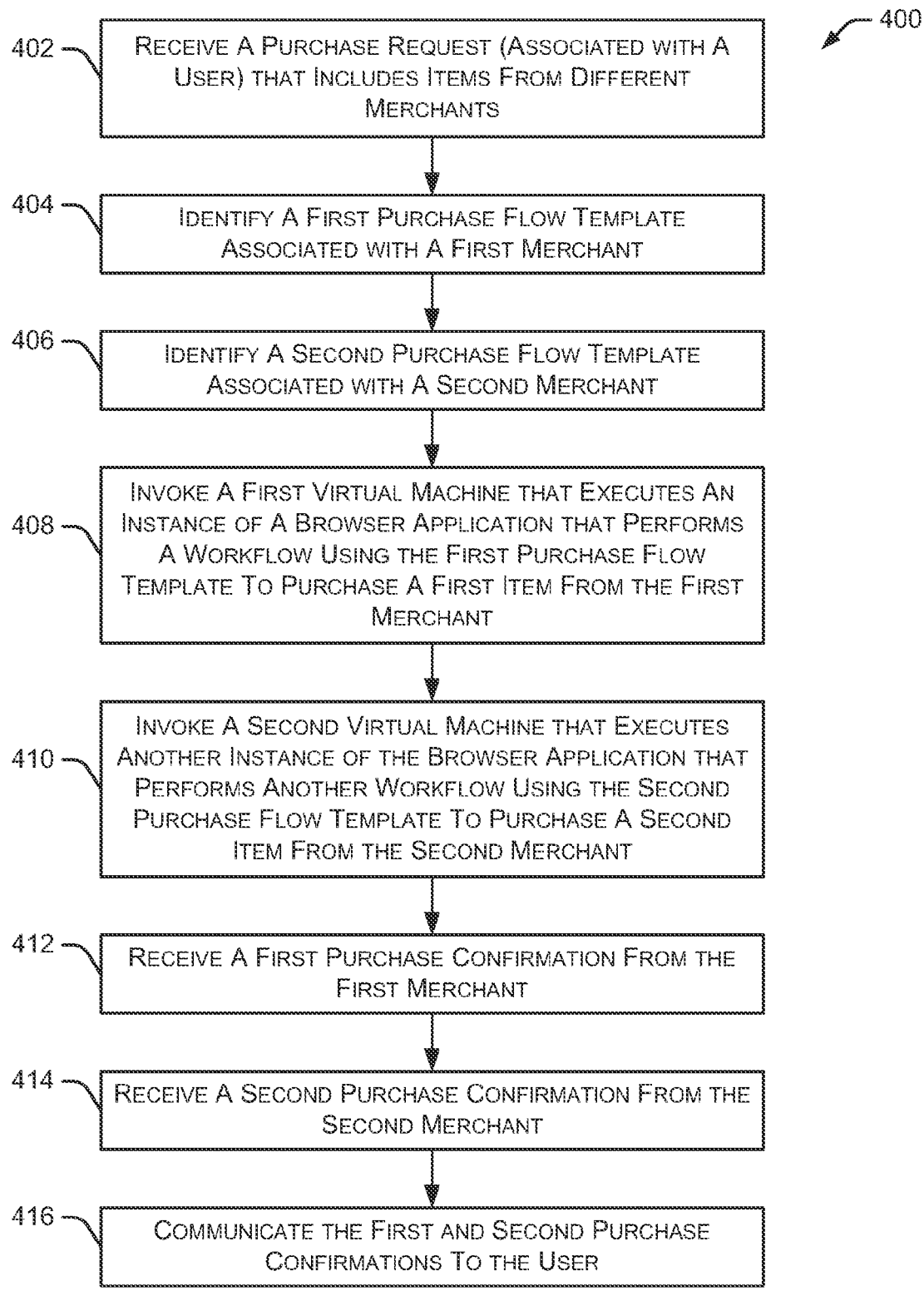
FIG. 4 is a flow diagram depicting an embodiment of a method for purchasing multiple items from multiple merchants.

FIG. 4 is a flow diagram depicting an embodiment of a method 400 for purchasing multiple items from multiple merchants. Method 400 is implemented, for example, within environment 100 shown in FIG. 1. Initially, a purchase request associated with a user is received at 402. The purchase request includes items from different merchants. Method 400 identifies a first purchase flow template associated with a first merchant at 404. The first purchase flow template defines how to interact with the first merchant's web site(s) to select items for purchase and to complete the purchase of the items from the first merchant. Method 400 continues by identifying a second purchase flow template associated with a second purchase flow template at 406. The second purchase flow template defines how to interact with the second merchant's web site(s) to select and purchase items from the second merchant.

Method 400 continues by invoking a first virtual machine that executes an instance of a browser application that performs a workflow using the first purchase flow template to purchase a first item from the first merchant at 408. Additionally, a second virtual machine is invoked that executes another instance of the browser application that uses the second purchase flow template to purchase a second item from the second merchant at 410. The second virtual machine operates independently of the first virtual machine. In one embodiment, the first and second virtual machines each execute an instance of a browser application, such as Firefox™, Safari™, Internet Explorer™ or Google Chrome™. The first and second virtual machines can be invoked at substantially the same time or may be invoked sequentially (e.g., the second virtual machine is invoked after the first virtual machine has completed its purchase transaction). After the first virtual machine has completed its purchase transaction, a first purchase confirmation is received from the first merchant at 412. Similarly, after the second virtual machine has completed its purchase transaction, a second purchase confirmation is received from the second merchant at 414. Method 400 then communicates the first and second purchase confirmations to the user at 416. In alternate embodiments, method 400 communicates each purchase confirmation to the user individually upon receipt instead of aggregating the purchase confirmations as described in FIG. 4. As discussed above, method 400 describes an example of purchasing two items from two merchants. Alternate embodiments may purchase any number of items from any number of merchants.

By executing each instance of the browser application in a separate virtual machine, the multiple browser instances do not interfere with one another. Additionally, each instance of the browser application can be limited to accessing a particular merchant's web site. This approach improves security since a particular instance of the browser application will not be exposed to data from multiple merchants (or user account information associated with multiple merchants). Additionally, this approach limits the ability of malicious algorithms to infect the transaction by attempting to force a connection to an unapproved web site.

Figure 5:
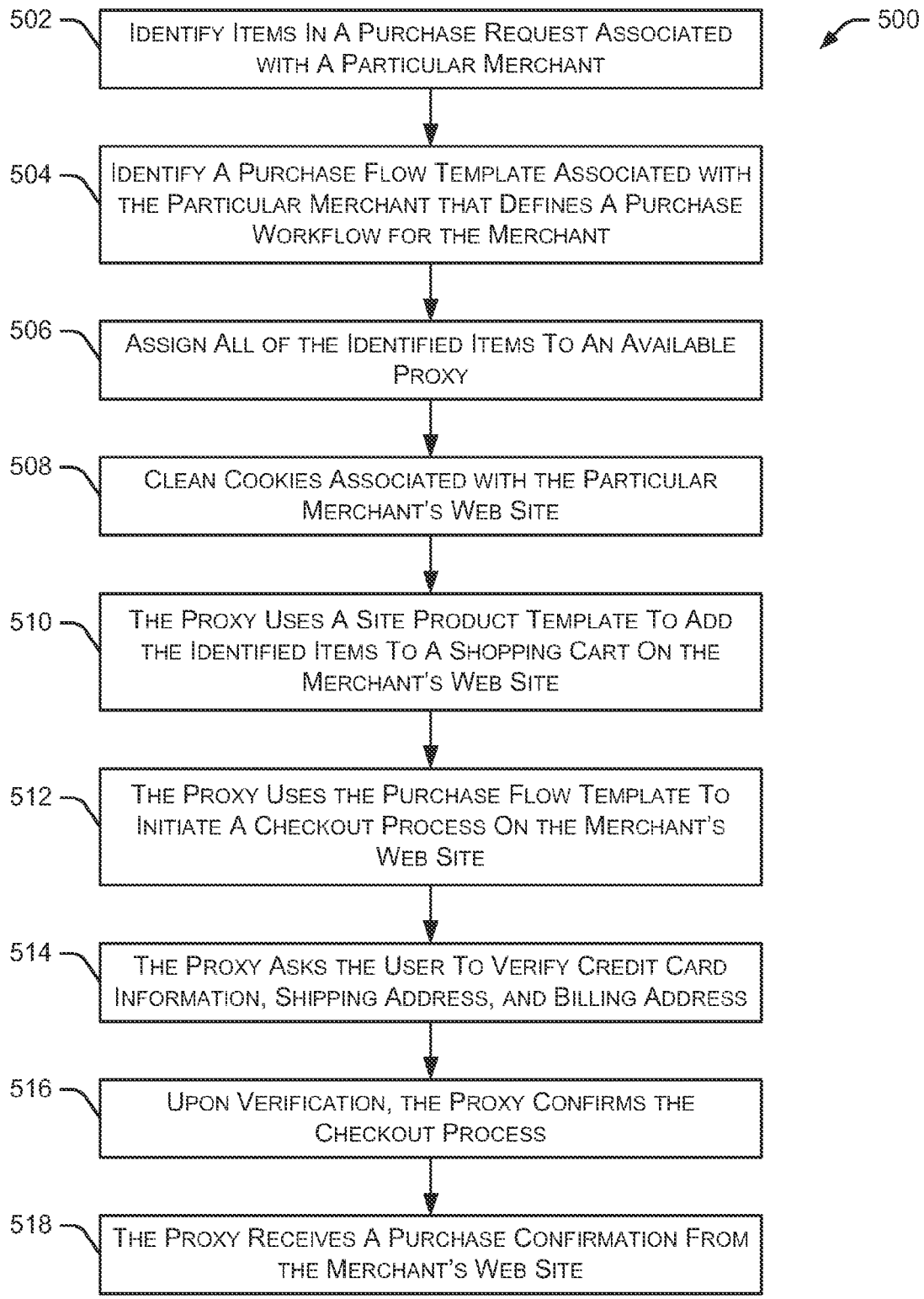
FIG. 5 is a flow diagram depicting an embodiment of a method for purchasing a particular item from a particular merchant.

FIG. 5 is a flow diagram depicting an embodiment of a method 500 for purchasing a particular item from a particular merchant. Method 500 is implemented, for example, within environment 100 shown in FIG. 1. Initially, method 500 identifies items in a purchase request associated with a particular merchant at 502 and identifies a purchase flow template associated with the particular merchant that defines a purchase workflow for the merchant at 504. All items associated with the particular merchant are assigned to an available proxy at 506 (e.g., one of the purchasing proxies 208 shown in FIG. 2). In alternate embodiments, each item associated with a particular merchant is assigned to a separate proxy.

Method 500 continues by cleaning cookies associated with the particular merchant's web site at 508. This cleaning of cookies is performed, for example, to provide a clean environment for the new purchase transaction. In some situations, the existing cookies may be associated with a different user. Thus, the cleaning of cookies can remove items previously added to a merchant shopping cart and remove other user-specific data that may not be relevant to the new purchase transaction. The proxy uses a site product template to add the identified items to a shopping cart (or similar mechanism) on the merchant's web site at 510. The site product template includes various instructions (such as xpath or jQuery locators) used to extract product information and other data from a web site. The extracted information includes, for example, images, descriptions, links, names, colors, sizes, prices, and the like.

In some embodiments, method 500 also determines item availability and price information (e.g., confirming the price that the user saw when initially selecting an item) before continuing with the checkout process. The proxy then uses the purchase flow template to initiate a checkout process on the merchant's web site at 512. In one embodiment, the proxy asks the user to verify credit card information, shipping address, and billing address at 514. Upon user verification of this information, the proxy confirms the checkout process at 516. In other embodiments, the verifications of credit card information, shipping address, and billing address are completed earlier (e.g., during method 300 discussed with respect to FIG. 3) and are not performed during method 500. The verification performed at 516 may also include verification of item prices, shipping costs, and the like. After completion of the checkout process, the proxy receives a purchase confirmation from the merchant's web site at 518.

Method 500 is implemented for each merchant associated with a specific purchase request. Thus, method 500 may be implemented simultaneously for each merchant identified in a purchase request. In the "universal shopping cart" embodiment discussed herein, the user may be asked to verify the order contents of the "universal shopping cart" (i.e., all items from all merchants) before initiating the checkout process. At this point, the user can edit one or more items in the "universal shopping cart" prior to confirming the order contents. Additionally, the user may be asked once to verify credit card information, shipping address, and billing address. This single verification is applicable to all items purchased from all merchants.

Figure 6:
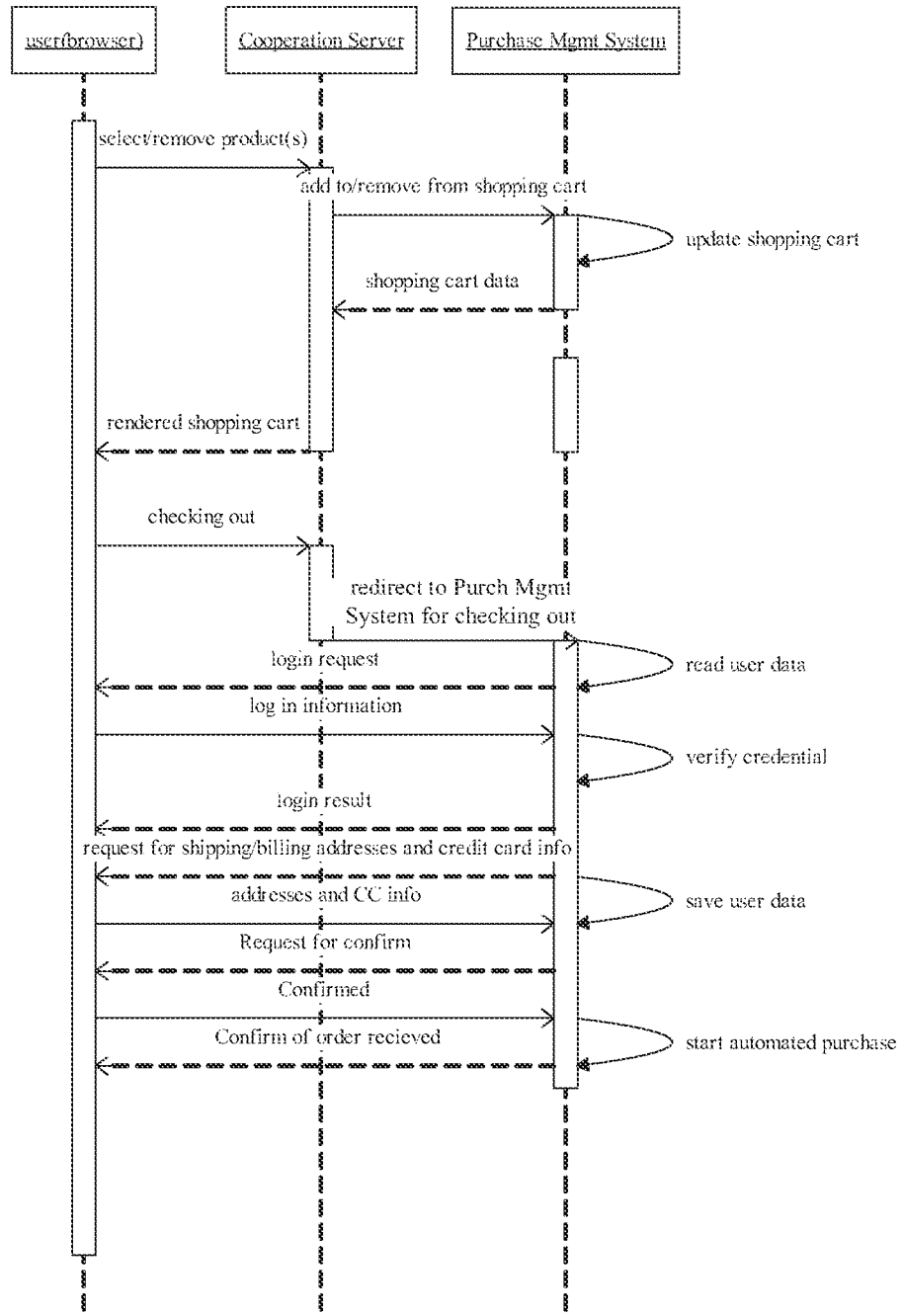
FIG. 6 is a process diagram depicting an embodiment of a process for purchasing an item from a merchant.

FIG. 6 is a process diagram depicting an embodiment of a process 600 for purchasing an item from a merchant. Process 600 includes two stages: a first stage that defines how to add one or more products to a merchant's shopping cart, and a second stage that defines how to check out on the merchant's web site. In a particular embodiment, a workflow defines the interactions between the proxy (i.e., instance of a browser application) and a target merchant website for an automated purchase. The workflow includes a preprocessing action and two stages. The preprocessing action is a proxy preparation to clean up for a new purchase. For example, the preprocessing action cleans cookies for the domain(s) related to the purchase being initiated. As mentioned above, the actual purchase includes a first stage that defines how to add one or more products to the merchant's shopping cart, and a second stage that defines how to check out on the merchant's web site.

When adding one or more products to a merchant's shopping cart, the process defines a list of actions to be executed by the proxy on the merchant's web page. These actions include, for example, clicking, data extraction, pull-down box selection, sleeping, form submission, and the like. As discussed herein, the proxy will clean cookies associated with the particular merchant's web site. After cleaning the cookies, a sleep action is performed to give previously executed actions time to complete. In one embodiment, a sleep action sleeps the execution thread for three seconds. After cleaning the cookies, a product and product options are defined, such as product color, product size, and the like. After a product and product options are defined, a click action is performed on an "Add to Cart" button, which adds the product to the merchant's shopping cart. After all products are added to the merchant's shopping cart, a click action is performed on a "Check Out" or similar button. User data is then supplied to the merchant site to complete the checkout process.

Figure 7:
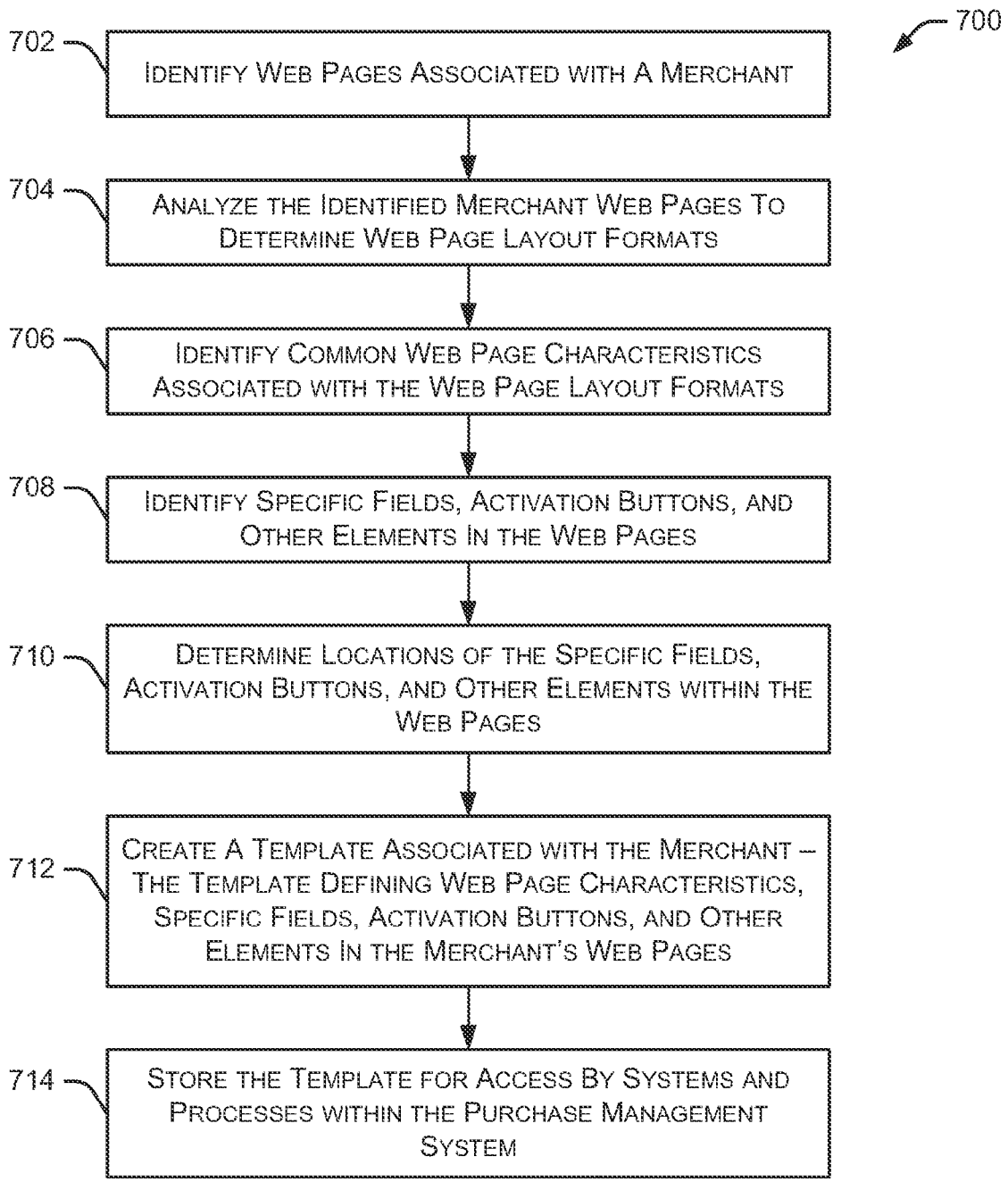
FIG. 7 is a flow diagram depicting an embodiment of a method for creating a purchase flow template associated with a merchant's web site.

FIG. 7 is a flow diagram depicting an embodiment of a method 700 for creating a purchase flow template associated with a merchant's web site. Method 700 is implemented, for example, within environment 100 shown in FIG. 1. Initially, web pages associated with a merchant are identified at 702. These web pages include product listing web pages, product ordering web pages, shopping cart web pages, order checkout web pages, and the like. Method 700 analyzes the identified merchant web pages to determine web page layout formats at 704. For example, web page layout formats may include web page fields or locations containing product descriptions, product quantity available, product pricing, product color data, product size data, product style data, and the like. These web page layout formats may define particular regions of the web page that contain various fields, activation buttons, and other information.

Method 700 continues by identifying common web page characteristics associated with the web page layout formats at 706. These common web page characteristics include, for example, a location of a "buy" or "add to cart" button, location of product information, and the like. In some situations, certain product groups may contain common web page characteristics. For example, jewelry web pages for a merchant may use a common web page layout and clothing web pages for the same merchant may use a different web page layout. Additionally, method 700 identifies specific fields, activation buttons, and other elements in the web pages at 708. These fields, activation buttons, and other elements may be associated with specific web pages, groups of web pages (i.e., common web page characteristics mentioned above) or all web pages associated with a particular merchant. Method 700 continues by determining locations of the specific fields, activation buttons, and other elements within the web pages at 710. Additionally, method 700 determines a "purchase flow", which is a series of steps performed on one or more merchant web pages to complete the purchase transaction. For example, the merchant web pages may include a shopping cart review page (e.g., a list of items being purchased, item descriptions, and item prices), a user data entry page (e.g., user name and shipping address), a payment page (e.g., credit card or other payment information), and an order confirmation page.

A purchase flow template is created and associated with the merchant at 712. The purchase flow template defines web page characteristics, specific fields, activation buttons, and other elements in one or more of the merchant's web pages. In some embodiments, the purchase flow template contains code, scripts, and pointers to particular fields and other elements in the merchant web page(s). The purchase flow template is then stored for access by systems and processes within the purchase management system 112. In situations where a merchant uses multiple different formats for the web pages, multiple purchase flow templates are created for each of the different formats. The purchase flow templates are periodically tested to be sure they continue to accurately define the merchant's web pages. If a merchant's web page has changed, the corresponding purchase flow template is updated in an appropriate manner.

In some embodiments, site product templates are created in addition to the purchase flow templates discussed above. The site product templates describe, for example, locations of specific product information within one or more web site product pages. These site product templates allow the systems and methods described herein to obtain product information and purchase items from merchants. In these embodiments, the site product templates are used in combination with the purchase flow templates to implement the described purchasing systems and methods. In particular embodiments, product data may already be available in a database or data warehouse, thereby eliminating the need for the site product templates. In these embodiments, the purchase flow templates are still used to implement the purchase processes discussed herein. For example, some merchants may provide the product data directly to the described systems rather than requiring the described systems to retrieve the data from the merchant web sites.

Figure 8:
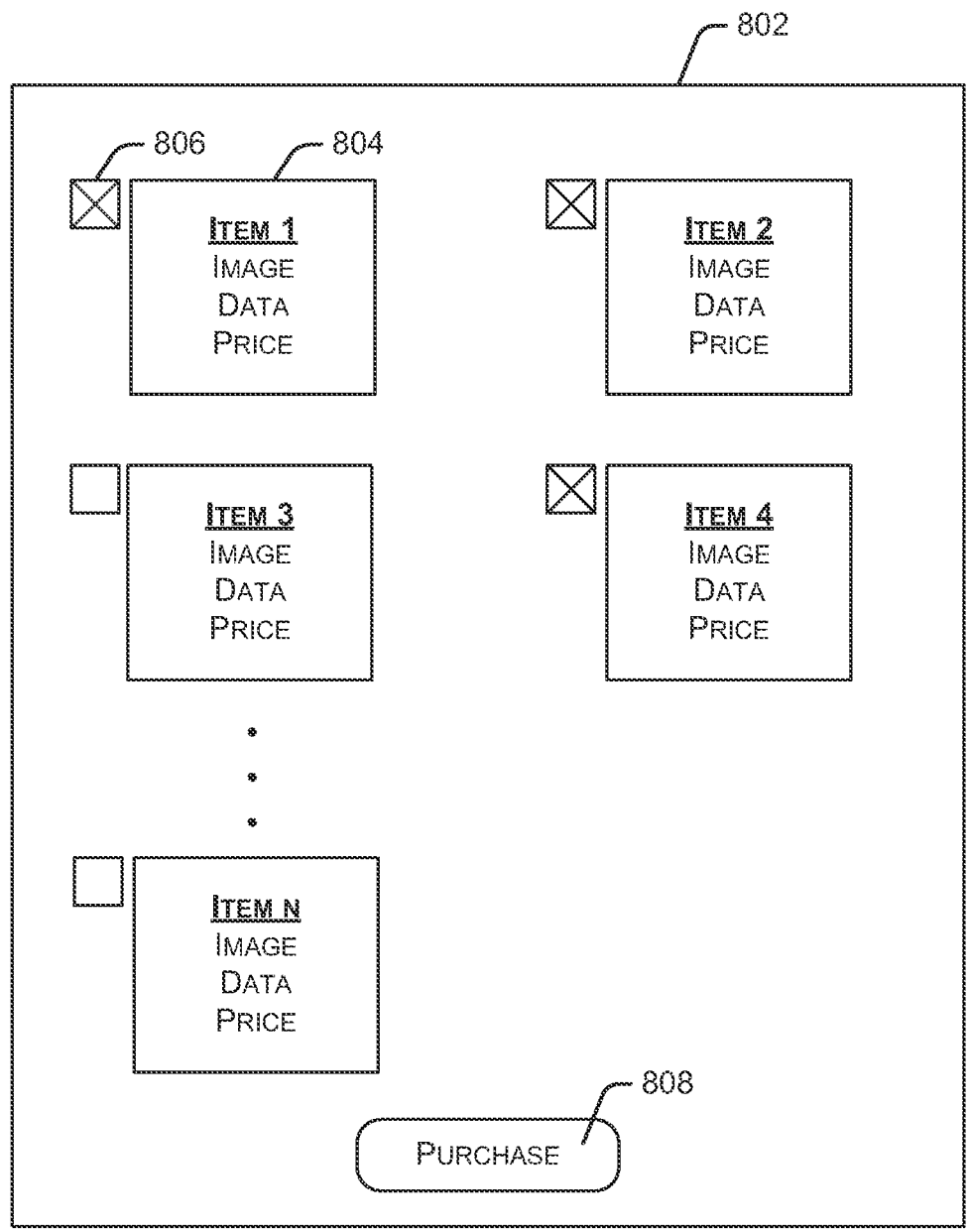
FIG. 8 depicts example user interface components presented during an online purchase transaction.

FIG. 8 depicts example user interface components presented during an online purchase transaction. An example web page 802 includes multiple items 804 (labeled "Item 1", "Item 2", and so forth) available for purchase by a user. In the example of FIG. 8, each item includes an image of the item, information about the item (e.g., color, size, and style), and the price of the item. Alternate embodiments of web page 802 may display other types of information regarding the displayed items. As discussed herein, the multiple items displayed in FIG. 8 may be associated with different merchants or retailers. Each of the multiple items includes a check box 806 located proximate the item. The user activates (e.g., clicks) the check boxes for each of the items the user wants to purchase. In this example, the user has selected to purchase Item 1, Item 2, and Item 4. After the user selects the desired items, the user activates (e.g., clicks) a purchase button 808 displayed on web page 802, which initiates the automated purchase process discussed herein An example purchase flow template is provided below. A description of the various template components is provided following the example purchase flow template.

```
1.    {
2.        "cookieSettings": {
3.            "domains": [
4.                "http://acmestore.com",
5.                "http://shop. acmestore.com"
6.            ]
7.        },
8.        "stage": [
9.            {
10.               "type": "add2Cart",
11.               "description": "select products",
12.               "step": [
13.                   {
14.                       "url": "",
15.                       "description": "select color/size and add to cart",
16.                       "verifyData": [
17.                           {
18.                               "selector": "input[id='addToBagButton']",
19.                               "propertyType": "",
20.                               "verifyType": "exists",
21.                               "value": ""
22.                           }
23.                       ],
24.                       "formData": [ ],
```

-continued

```
25.            "formActions": [
26.                {
27.                    "selector": "",
28.                    "action": "clear-cookie"
29.                },
30.                {
31.                    "selector": "",
32.                    "action": "sleep"
33.                },
34.                {
35.                    "selector": "",
36.                    "action": "options"
37.                },
38.                {
39.                    "selector": "input[id='addToBagButton']:first",
40.                    "action": "click"
41.                }
42.            ],
43.            "productOptions":
44.                {
45.                    "name": "color",
46.                    "selector": "select[id*='color-dropdown']>option",
47.                    "attr": "value",
48.                    "labelAttr": "html"
49.                },
50.                {
51.                    "name": "size",
52.                    "selector": "li[class='button'] label",
53.                    "attr": "innerHTML"
54.                }
55.            ],
56.            "resultExtractor": [
57.                "div[id='skuSelector_size1Value']"
58.            ],
59.            "resultVerify": {
60.                "selector": "#shoppingBagCount",
61.                "propertyType": "html",
62.                "verifyType": "not-equal",
63.                "value": "0"
64.            },
65.            "submitAction": null
66.        }
67.    ]
68. },
69. {
70.     "type": "checkout",
71.     "description": "Checking out",
72.     "step": [
73.         {
74.             "url": "https://secure.acmestore.com/shoppingbag.aspx?bco=1&origin=tab",
75.             "description": "checking out landing page",
76.             "verifyData": [
77.                 {
78.                     "selector": "a[id*='guestCheckoutButton']",
79.                     "propertyType": "",
80.                     "verifyType": "exists",
81.                     "value": ""
82.                 }
83.             ],
84.             "formData": [ ],
85.             "formActions": [ ],
86.             "resultExtractor": [ ],
87.             "resultVerify": null,
88.             "submitAction": {
89.                 "selector": "a[id*='guestCheckoutButton'] img",
90.                 "action": "click"
91.             }
92.         },
93.         {
94.             "url": "https://secure.acmestore.com/AddressSetup.aspx?origin=shoppingbag",
95.             "description": "shipping/billing page",
96.             "verifyData": [
97.                 {
98.                     "selector": "a[title='Save and Continue']",
99.                     "propertyType": "",
100.                    "verifyType": "exists",
101.                    "value": ""
```

```
102.                }
103.            ],
104.            "formData": [
105.                {
106.                    "selector": "input[id*='emailAddress']",
107.                    "map": "Address.shippingAddress.contactEmail",
108.                    "value":
109.                },
110.                {
111.                    "selector": "input[id*='emailAddressConfirm']",
112.                    "map": "Address.shippingAddress.contactEmail",
113.                    "value": ""
114.                },
115.                {
116.                    "selector": "input[id*='phoneNumber']",
117.                    "map": [
118.                        "Address.shippingAddress.contactPhoneAreaCode",
119.                        "Address.shippingAddress.contactPhoneExCode",
120.                        "Address.shippingAddress.contactPhoneSubCode"
121.                    ],
122.                    "value": ""
123.                },
124.                {
125.                    "selector": "input[name*='billingAddressForm$firstName']",
126.                    "map": "Address.billingAddress.firstName",
127.                    "value":
128.                },
129.                {
130.                    "selector": "input[name*='billingAddressForm$lastName']",
131.                    "map": "Address.billingAddress.lastName",
132.                    "value": ""
133.                },
134.                {
135.                    "selector": "input[name*='billingAddressForm$address1']",
136.                    "map": "Address.billingAddress.addr1",
137.                    "value":
138.                },
139.                {
140.                    "selector": "input[name*='billingAddressForm$address2']",
141.                    "map": "Address.billingAddress.addr2",
142.                    "value":
143.                },
144.                {
145.                    "selector": "input[name*='billingAddressForm$city']",
146.                    "map": "Address.billingAddress.city",
147.                    "value":
148.                },
149.                {
150.                    "selector": "select[name*='billingAddressForm$stateProvince']",
151.                    "map": "Address.billingAddress.state",
152.                    "value": ""
153.                },
154.                {
155.                    "selector": "input[name*='billingAddressForm$zipCode']",
156.                    "map": "Address.billingAddress.zipcode",
157.                    "value": ""
158.                },
159.                {
160.                    "selector": "input[name*='shippingAddressForm$firstName']",
161.                    "map": "Address.shippingAddress.firstName",
162.                    "value": ""
163.                },
164.                {
165.                    "selector": "input[name*='shippingAddressForm$lastName']",
166.                    "map": "Address.shippingAddress.lastName",
167.                    "value": ""
168.                },
169.                {
170.                    "selector": "input[name*='shippingAddressForm$address1']",
171.                    "map": "Address.shippingAddress.addr1",
172.                    "value": ""
173.                },
174.                {
175.                    "selector": "input[name*='shippingAddressForm$address2']",
176.                    "map": "Address.shippingAddress.addr2",
177.                    "value": ""
178.                },
179.                {
```

```
180.                "selector": "input[name*='shippingAddressForm$city']",
181.                "map": "Address.shippingAddress.city",
182.                "value": ""
183.            },
184.            {
185.                "selector": "select[name*='shippingAddressForm$stateProvince']",
186.                "map": "Address.shippingAddress.state",
187.                "value": ""
188.            },
189.            {
190.                "selector": "input[name*='shippingAddressForm$zipCode']",
191.                "map": "Address.shippingAddress.zipcode",
192.                "value": ""
193.            }
194.        ],
195.        "formActions": [ ],
196.        "resultExtractor": [ ],
197.        "resultVerify": null,
198.        "submitAction": {
199.            "selector": "a[id*='saveAndContinueButton'] img",
200.            "action": "click",
201.            "delayAction": {
202.                "selector": "a[id*='standardAddressSuggestions_btnSuggestionUse1Button'] img",
203.                "action": "click",
204.                "delay": 1000
205.            }
206.        }
207.    },
208.    {
209.        "url": null,
210.        "description": "payment page",
211.        "verifyData": [
212.            {
213.                "selector": "a[id*='orderSubmitPanel_submitOrderButton']",
214.                "propertyType": "",
215.                "verifyType": "exists",
216.                "value": ""
217.            }
218.        ],
219.        "formData": [
220.            {
221.                "selector": "select[name*='$creditCardPaymentSelector$currentCreditCard$creditCardList1']",
222.                "map": "CreditCardInfo.cardType",
223.                "value": "",
224.                "sleep": 600
225.            },
226.            {
227.                "selector": "input[id*='creditCardPaymentSelector_currentCreditCard_otherCardNumber']",
228.                "map": "CreditCardInfo.cardNo",
229.                "value": ""
230.            },
231.            {
232.                "selector": "select[name*='currentCreditCard$expirationMonth']",
233.                "map": "CreditCardInfo.expMonth",
234.                "value": ""
235.            },
236.            {
237.                "selector": "select[name*='currentCreditCard$expirationYear']",
238.                "map": "CreditCardInfo.expYear",
239.                "value": ""
240.            },
241.            {
242.                "selector": "input[name*='currentCreditCard$creditCardSecurityCode']",
243.                "map": "CreditCardInfo.CVV",
244.                "value": ""
245.            }
246.        ],
247.        "needUserConfirm": true,
248.        "formActions": [
249.            {
250.                "selector": "",
```

```
251.              "action": "sleep"
252.            }
253.          ],
254.          "resultExtractor": [
255.            "div[class='item-module']"
256.          ],
257.          "resultVerify": null,
258.          "submitAction": {
259.            "selector": "a[id*='orderSubmitPanel_submitOrderButton'] img",
260.            "action": "click"
261.          }
262.        },
263.        {
264.          "url": null,
265.          "description": "result page",
266.          "verifyData": [
267.            {
268.              "selector": "span[class*='orecContentWrap or-confrm-content']",
269.              "propertyType": "html",
270.              "verifyType": "contains",
271.              "value": "Thanks for your order"
272.            }
273.          ],
274.          "formData": [ ],
275.          "formActions": [ ],
276.          "resultExtractor": [
277.            "span[class*='orecContentWrap or-confrm-content']"
278.          ],
279.          "resultVerify": null,
280.          "submitAction": null
281.        }
282.      ]
283.    }
284.  ],
285.  "dataMap": {
286.    "Address.billingAddress.state": {
287.      "CA": "71|0"
288.    },
289.    "Address.shippingAddress.state": {
290.      "CA": "71|0"
291.    },
292.    "CreditCardInfo.cardType": {
293.      "Acmestore Card": "1",
294.      "Acmestore Visa": "2",
295.      "Acmestore Debit": "14",
296.      "V": "3",
297.      "M": "4",
298.      "O": "5",
299.      "A": "7",
300.    }
301.  }
302. }
```

The example purchase flow template shown above defines the interactions between the proxy (e.g., browser) and the merchant website for an automated purchase. A pre-processing action is a preparation to clean up for a new purchase. Specifically, in this action, the systems and methods clean cookies for the domain(s) related to the coming purchase. The actual purchase is implemented in the next two stages. The first stage defines the interactions needed for adding products into the shopping cart of the merchant site. The second stage defines the steps for checking out (e.g., purchasing items in the shopping cart) on the merchant site. To illustrate the interactions, the example purchase flow template describes purchases on Acmestore.com as follows.

Lines 2-6 of the purchase flow template define a list of domains whose cookies should be cleaned before a new purchase can be executed on Acmestore. Some merchant websites store cookies on several hosts. So the systems and methods provide the ability to define the cookie removal setting as a Javascript array.

Lines 8-68 of the purchase flow template define the stage of adding products to a shopping cart on Acmestore. Generally, a stage can contain several steps. Each step defines a set of interactions on one particular page of the merchant site. In this stage, there is only one step (Lines 13-66). Detailed introductions of this step are given as follows. The first attribute of this step is url, which is empty in its definition. For steps in this stage, the value of url will be assigned by the proxy using the data from user's request. The description attribute is a text value describing the functionality of this step. The verifyData attribute defines an array of verifications on the loaded page. These verifications make sure that the page complies with what is expected and all necessary information is loaded successfully. Basically, each verification unit composes of what to verify (selector and propertyType) and how to verify (verifyType and value). The formData defines how and what to put user data into a form on one web page. In this step, there is no form data that needs to be added. So it's an empty array.

The formActions is a list of actions the proxy will execute on one web page. In the described systems and methods, various types of actions are defined including clicking, data extraction, dropbox selection, sleeping, form submission, and the like. Each formAction includes two attributes of selector and action. The former defines which DOM element is to be acted on. The latter defines the actual action needed to be executed. In particular embodiments, the formActions are executed sequentially. In this formActions, the proxy will first clean cookies on this page. Then, it sleeps for a period of time. The sleep action is usually needed somewhere in the sequence of actions because some previous actions need time to finish. A sleep action sleeps the execution thread for three seconds. If more time is needed, more sleep actions can be provided. After the sleep, the proxy will select product options on the user's behalf. The product options are defined in the attribute of productOptions, which include product color, size, and the like. After the options have been selected, the last action will click on an "addTo-Cart" button so that the products will be added to the shopping cart of the merchant site. The productOptions define where the product options are and how to select them. The selector defines the locator for the DOM element and the attr defines what attribute is used for specifying the option. The resultExtrator is an array that defines what contents are to be extracted for logging and debugging purposes after all actions are executed on this page. resultVerify is an array that verifies whether the actions on the current page have been executed successfully and whether the expected results have been achieved. If the verifications failed, the purchase of this product will be cancelled (but not necessarily the entire purchase). This ensures that each page is processed as expected. submitAction defines the actions needed to submit a form on some web pages. Typically, for form submission, there is a submit button that is clicked after all the actions and data have been processed on the page.

Lines 68-284 of the purchase flow template define the checkout stage. This stage includes four steps. The step definitions in this stage are the same as those in the first stage. So the details are similar to those explained in the last stage above. One additional attribute is the formData attribute. From lines 104 to 194, there is an example of formData. Each formData entry defines how to specify a value in a form element. Each entry includes three attributes: selector, map, and value. Selector defines which form element is to be set. Map defines how to map the value of user data into this element. For example, the map attribute defines the attribute name in user data object. The value can be a fixed value in the workflow definition which makes it possible to use predefined values.

Lines 285-300 of the purchase flow template define data translations from data values used by the systems and methods described herein to the values which the merchant site is using. For example, in the described systems and methods, the credit card type of Visa is annotated as V. But, the Acmestore web site simply uses "3" to specify the Visa card. So, the purchase flow template defines the necessary data translations.

Figure 9:
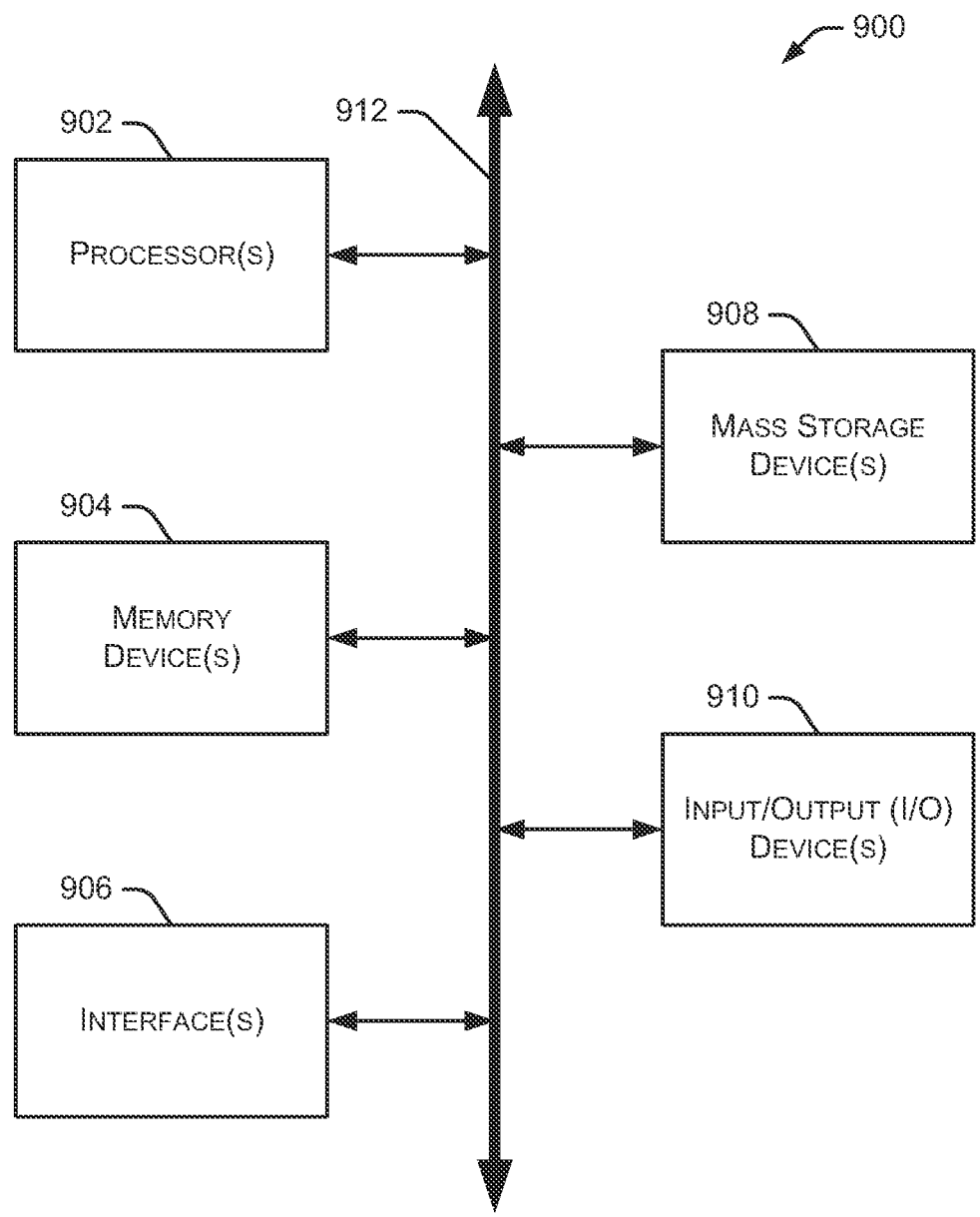
FIG. 9 is a block diagram depicting an example computing device.

FIG. 9 is a block diagram depicting an example computing device 900. Computing device 900 may be used to perform various procedures, such as those discussed herein. Computing device 900 can function as a server, a client or any other computing entity. Computing device 900 can be any of a wide variety of computing devices, such as a desktop computer, a notebook computer, a server computer, a handheld computer, a tablet, and the like.

Computing device 900 includes one or more processor(s) 902, one or more memory device(s) 904, one or more interface(s) 906, one or more mass storage device(s) 908, and one or more Input/Output (I/O) device(s) 910, all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM)) and/or nonvolatile memory (e.g., read-only memory (ROM)). Memory device(s) 904 may also include rewritable ROM, such as Flash memory.

Mass storage device(s) 908 include various computer readable media, such as magnetic tapes, magnetic disks, optical disks, solid state memory (e.g., Flash memory), and so forth. Various drives may also be included in mass storage device(s) 908 to enable reading from and/or writing to the various computer readable media. Mass storage device(s) 908 include removable media and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, lenses, CCDs or other image capture devices, and the like.

Interface(s) 906 include various interfaces that allow computing device 900 to interact with other systems, devices, or computing environments. Example interface(s) 906 include any number of different network interfaces, such as interfaces to local area networks (LANs), wide area networks (WANs), wireless networks, and the Internet.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method comprising:
   receiving, by a computer system, one or more purchase requests identifying a first item to purchase from a first merchant and a second item to purchase from a second merchant that is distinct from the first merchant;
   purchasing, by the computer system, the first and second items by
      invoking, within the computer system, a first virtual machine, following, within a first install of a browser application running within the first virtual machine, a first work-flow tailored to a first website of the first merchant in order to purchase the first item from the first merchant via the first website, limiting the first install to accessing the first website, invoking, within the computer system after the purchase of the first item, a second virtual machine that is operationally independent of the first virtual machine, following, within a second install of the browser application running within the second virtual machine, a second work-flow tailored to a second website of the second merchant in order to purchase the second item from the second merchant via the second website, and limiting the second install to accessing the second website;

receiving a first purchase confirmation from the first merchant; and receiving a second purchase confirmation from the second merchant.

2. The method of claim 1, wherein the purchasing the first and second items further comprises:

deleting one or more cookies corresponding to the first install prior to the following the first work-flow; and deleting one or more cookies corresponding to the second install prior to the following the second work-flow.

3. The method of claim 2, further comprising communicating a purchase confirmation to one or more users responsive to receiving the first and second purchase confirmations.

4. The method of claim 2, further comprising:

communicating the first purchase confirmation to a particular user; and communicating the second purchase confirmation to the particular user.

5. The method of claim 1, further comprising periodically testing, by the computer system prior to the receiving the one or more purchase requests, the first and second work-flows to determine whether they are current with respect to the first and second websites, respectively.

6. The method of claim 5, further comprising determining, by the computer system based on the testing, the first work-flow is out of date with respect to the first website.

7. The method of claim 5, further comprising updating, by the computer system prior to the receiving the one or more purchase requests, the first work flow to be current with respect to the first website.

8. The method of claim 1, wherein the one or more purchase requests include item data associated with the first item and the second item.

9. The method of claim 8, wherein the item data includes one or more of an item size, an item color, shipping data, and payment data.

10. The method of claim 1, wherein the first and second websites are each publicly available.

11. The method of claim 1, wherein the first and second websites are each designed for humans to browse and purchase items.

12. A method comprising:

receiving, by a computer system, one or more purchase requests comprising consumer data and identifying a first item to purchase from a first merchant and a second item to purchase from a second merchant that is distinct from the first merchant; and purchasing, by the computer system, the first and second items by invoking, within the computer system, a first virtual machine, following, within a first install of a browser application running within the first virtual machine, a first work-flow tailored to a first website of the first merchant in order to purchase the first item from the first merchant via the first website, limiting the first install to accessing the first website, invoking, within the computer system after the purchase of the first item, a second virtual machine that is operationally independent of the first virtual machine, following, within a second install of the browser application running within the second virtual machine, a second work-flow tailored to a second website of the second merchant in order to purchase the second item from the second merchant via the second website, and limiting the second install to accessing the second website.

13. The method of claim 12, wherein the purchasing the first and second items further comprises:

deleting one or more cookies corresponding to the first install prior to the following the first work-flow; and deleting one or more cookies corresponding to the second install prior to the following the second work-flow.

14. The method of claim 12, further comprising periodically testing, by the computer system prior to the receiving the one or more purchase requests, the first and second work-flows to determine whether they are current with respect to the first and second websites, respectively.

15. The method of claim 14, further comprising determining, by the computer system based on the testing, the first work-flow is out of date with respect to the first website.

16. The method of claim 15, further comprising updating, by the computer system prior to the receiving the one or more purchase requests, the first work flow to be current with respect to the first website.

17. A method comprising: receiving, by a computer system, one or more purchase requests comprising consumer data and identifying a first item to purchase from a first merchant and a second item to purchase from a second merchant that is distinct from the first merchant; and purchasing, by the computer system using the consumer data, the first and second items by invoking, within the computer system, a first virtual machine, following, within a first install of a browser application running within the first virtual machine, a first work-flow tailored to a first website of the first merchant in order to purchase the first item from the first merchant via the first website, invoking, within the computer system after the purchase of the first item, a second virtual machine that is operationally independent of the first virtual machine, following, within a second install of the browser application within the second virtual machine, a second work-flow tailored to a second website of the second merchant in order to purchase the second item from the second merchant via the second website, and securing the consumer data against theft by limiting, during the purchasing, the first install to accessing the first website and the second install to accessing the second website.

* * * * *